(12) United States Patent
Ernich

(10) Patent No.: US 7,367,796 B2
(45) Date of Patent: May 6, 2008

(54) HEATING CYLINDER FOR ATTACHMENT TO AN INJECTION NOZZLE FOR AN INJECTION MOLDING SYSTEM

(75) Inventor: Juergen Ernich, Gross-Zimmern (DE)

(73) Assignee: Incoe Corporation, Troy, MI (US)

( * ) Notice: Subject to any disclaimer, the term of this patent is extended or adjusted under 35 U.S.C. 154(b) by 225 days.

(21) Appl. No.: 11/307,602

(22) Filed: Feb. 14, 2006

(65) Prior Publication Data

US 2006/0228440 A1    Oct. 12, 2006

(30) Foreign Application Priority Data

Feb. 18, 2005    (DE) .................... 10 2005 007 398

(51) Int. Cl.
*B29C 45/20* (2006.01)
(52) U.S. Cl. .................... 425/549; 264/328.15
(58) Field of Classification Search ............. 425/549; 264/328.15
See application file for complete search history.

(56) References Cited

U.S. PATENT DOCUMENTS

| | | | | |
|---|---|---|---|---|
| 3,997,098 | A | * | 12/1976 | Van Petten .................. 219/62 |
| 4,755,126 | A | * | 7/1988 | Leverenz .................... 425/549 |
| 4,882,469 | A | * | 11/1989 | Trakas ........................ 425/549 |
| 4,902,219 | A | * | 2/1990 | Leverenz .................... 425/549 |
| 4,913,912 | A | * | 4/1990 | Leverenz .................... 425/549 |
| 5,180,594 | A | * | 1/1993 | Trakas ........................ 425/549 |
| 5,871,786 | A | * | 2/1999 | Hume et al. ................ 425/549 |
| 7,108,502 | B2 | * | 9/2006 | Gellert et al. ............... 425/549 |

* cited by examiner

*Primary Examiner*—Tim Heitbrink
(74) *Attorney, Agent, or Firm*—John A. Artz; Dickinson Wright PLLC

(57) ABSTRACT

A hollow heating cylinder for attachment to an injection nozzle for an injection molding system. An elongated heating cartridge is spirally wound on the outside of the cylinder. The heating cartridge contains two electrically heatable heat conductors which are electrically separated from one another and are located in different regions in the longitudinal direction of the heating cartridge. One heat conductor is positioned for heating the mouth region of the nozzle and the other heat conductor is positioned for heating the shank region of the nozzle.

13 Claims, 2 Drawing Sheets

HEATING CYLINDER FOR ATTACHMENT TO AN INJECTION NOZZLE FOR AN INJECTION MOLDING SYSTEM

TECHNICAL FIELD

The present invention relates to heating cylinders for injection nozzles for injection molding systems.

BACKGROUND OF THE INVENTION

For understanding the problem underlying the present invention, reference is made to FIGS. 1 and 2 of the drawings. FIG. 1 shows an injection molding system, in schematic representation. From an injection molding machine connected via a feed bushing, hot melt (i.e. molten plastic material) is conducted through the flow channels 4 of a heated hot-channel distribution block 2 to two or more nozzles 10. The injection nozzles 10 are positioned in accommodating bores 8 in the injection-side member 5A of the mold tool 6. The injection nozzles are connected via the so-called mouth (or orifices) 13 to cavities 7, in which the molded parts are formed and which are usually found in the ejection-side part 5B of the tool 6.

There is a considerable difference between the required temperature of the melt and that of the tool. For example, the processing temperature of the melt can be 250° C., while the tool can have a temperature of 50° C. This temperature difference results in a considerable flow of heat away from the nozzles, especially at the points of contact between the nozzles and the tool. This heat loss must constantly be compensated by heating of the nozzles. This heating is effected by means of heating cylinders capable of being attached to the nozzles, to which the present invention relates. The most critical point with regard to the risk of overcooling of the melt is at the mouth 13, since here the heat-absorbing capacity of the surrounding nozzle material is small owing to the gradual reduction in the diameter of the nozzle and the fact that there is an intimate contact between the nozzle and the tool.

These conditions require that heating of the nozzle in the mouth region 12 must be greater than in the shank region 11. The heat supply required for this in the mouth region 12 is also heavily dependent upon the operating conditions, the material of the melt and the tool, and the shape of the mouth 13. In addition, the heat supply must be effectively controllable, since the range of the processing temperature of some melts is very narrow. In addition, in the cold state of the tool for example, a greater quantity of heat must be supplied to the mouth region 12.

It is already known that the nozzles may be equipped with two separate heating cylinders 20A, 20B, as shown, for example, in FIG. 2, specifically, one for the mouth region 12 and one for the shank region 11. The heat conductors of the two heating cylinders are capable of being controlled and/or regulated independently of one another. The heating cylinders typically consist essentially of a hollow supporting cylinder, which is provided with a spiral groove for the accommodation of a heating cartridge, in which a heat conductor is embedded. The pitch of the spiral groove on the supporting cylinder of the heating cylinder for the mouth region 12 is as a rule smaller than the pitch of the spiral groove on the supporting cylinder for the shank region 11. On the outside of the heating cylinder is found a protective metallic jacket 23. In FIG. 2, in addition to the illustration of the nozzle, the accommodating bore 8 in the tool is also indicated.

One disadvantage of this known system is that two separate heating cylinders 20A, 20B are required. An additional disadvantage is that the electrical connection 34 of the heating cylinder 20A for the mouth region lies quite far in front in the direction of the mouth, so that a corresponding longitudinal groove 9 (FIG. 2) must be provided for its accommodation in the bore 8 of the tool-injection-side member 5A. This necessity, apart from the additional expense, may in some tools also result in problems of space. Moreover, a considerable risk of damage to the electrical connection 34 exists upon introduction of the nozzles into the accommodating bores 8 of the tool. In FIG. 2, reference numeral 35A designates the electrical connection to the temperature sensor for the heating cylinder 20B. The corresponding temperature sensor for the heating cylinder 20A is not shown.

SUMMARY OF THE INVENTION

The object of the present invention is to provide an improved heating system for an injection machine nozzle.

The system according to the present invention utilizes only one heating cylinder instead of two separate heating cylinders as known in present systems. With the present invention, an elongated heating cartridge is spirally wound on the outside of the hollow heating cylinder. The heating cartridge contains two electrically heatable heat conductors which are electrically separated from one another and are located in essentially different regions in the longitudinal direction of the heating cartridge. One heat conductor is positioned for heating the mouth (orifice) region of the nozzle, while the other is positioned for heating the shank region of the nozzle. Hence the electrical connection 34, which in the prior art projects radially outward in the mouth region from the cylindrical member of the heating cylinder in the mouth region, is eliminated. Consequently, the accommodating groove 9 for this connection in the nozzle-accommodating bore 8 of the tool may be omitted. In addition, the space requirement in the cable channel of the system is reduced, since only one ISO cable for two heating connections is required. With the present invention, considerable cost savings are achieved.

BRIEF DESCRIPTION OF THE DRAWINGS

The invention is to be described in detail with reference to the figures, wherein.

DESCRIPTION OF THE PREFERRED EMBODIMENTS

Figure 4:
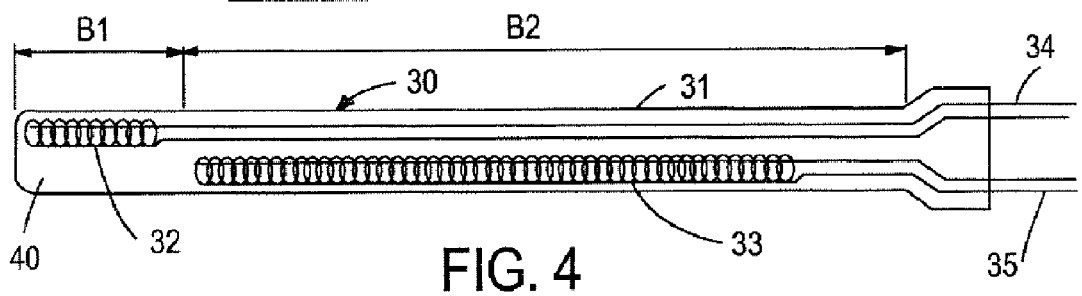
FIG. 4 illustrates an exemplary embodiment of a heating cartridge for a heating cylinder according to the present invention.

An exemplary embodiment of a heating cartridge according to the present invention is shown in FIG. 4. The cartridge 30 contains two heat conductors 32 and 33, which are wound to form spiral heating coils. The heating coils are accommodated in a metal sleeve 31, in which they are embedded in a conventional electrically insulating compound 40. The heating coil 32 is in the front (tool-side) part B1 of the sleeve 31, while the heating coil 33, which is spatially and electrically separated from the heating coil 32, is in the remaining portion B2 of the sleeve 31. The electrical connections 34 and 35 of the two heating coils are carried out of the metal sleeve 31 at the end opposite to the heating coil 32.

Figure 5:
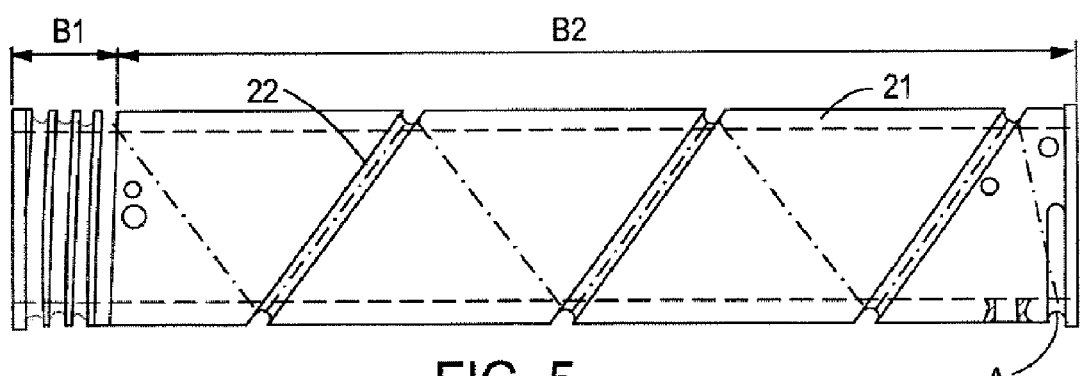
FIG. 5 illustrates an exemplary embodiment of a supporting cylinder for a heating cylinder according to the present invention.

The heating cartridge 30 is long as compared with its diameter, which is not readily apparent in FIG. 4, which shows the structure of the heating cartridge only schematically. In practice, the cartridge 30 resembles a long plastically deformable rod or wire and is wound on a hollow supporting cylinder, such as exemplary cylinder 21 shown in FIG. 5. For guidance of the heating cartridge to be wound, the outside of the supporting cylinder 21 is provided with a spiral groove 22, which in its mouth-side region B1 has a significantly smaller pitch than in its shank region B2. The lengths of the heating coils 32, 33 are adjusted to the supporting cylinder such that the windings of the spiral groove 22, lying close together in the mouth region B1, are substantially received by the heating coil 32, and the windings of the spiral groove 22 in the shank region B2, provided with a greater pitch, are substantially received by the heating coil 33. The connections 34 and 35 of the two heating coils are carried out of the heating cylinder 20 at A (FIG. 5). Radially outside the supporting cylinder 21, provided with the heating cartridge 30, is positioned a protective jacket 23, not represented in FIG. 5 but indicated in FIG. 3.

Figure 1:
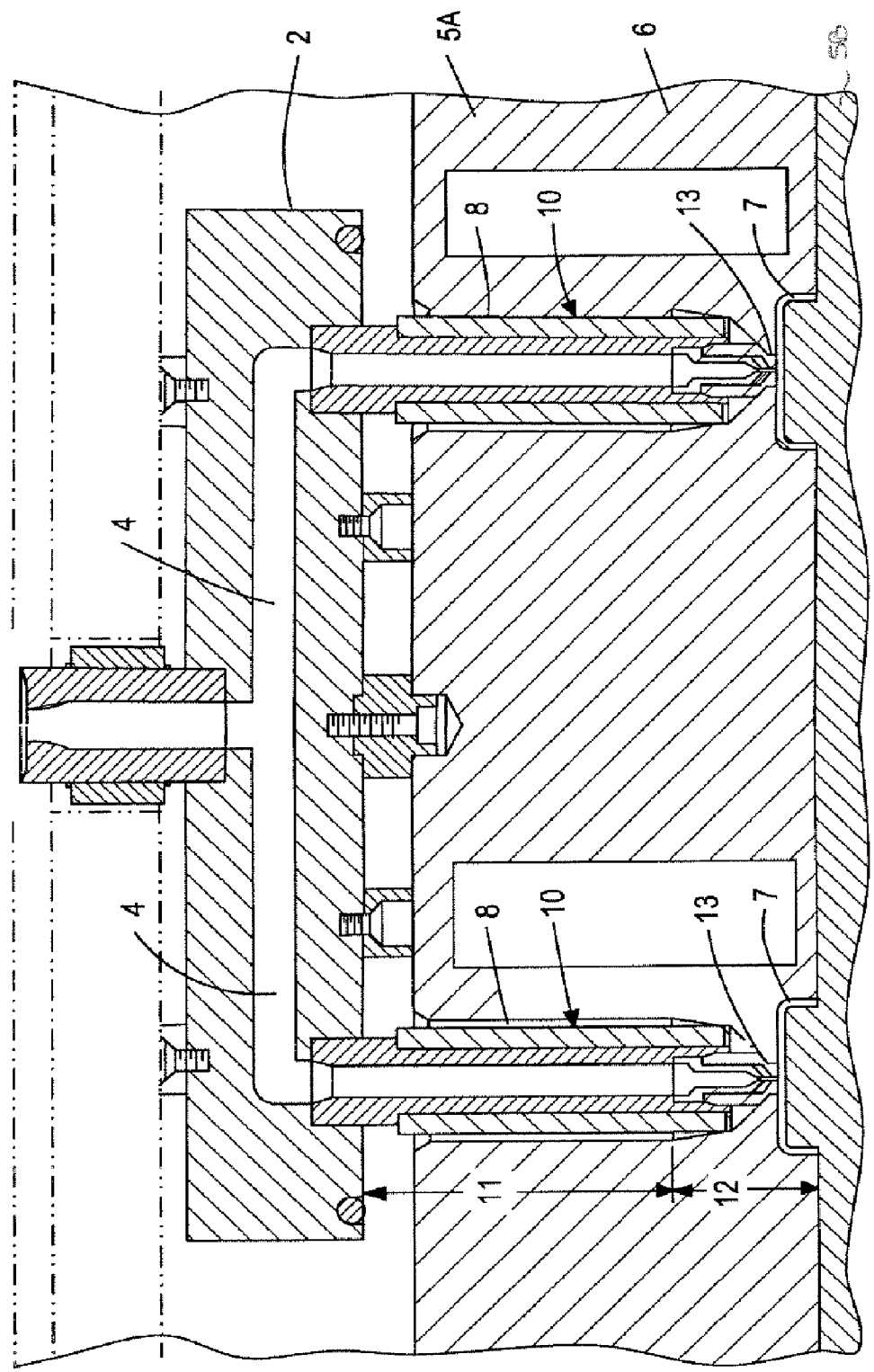
FIG. 1 shows a sketch of an injection molding system according to the prior art.
Figure 2:
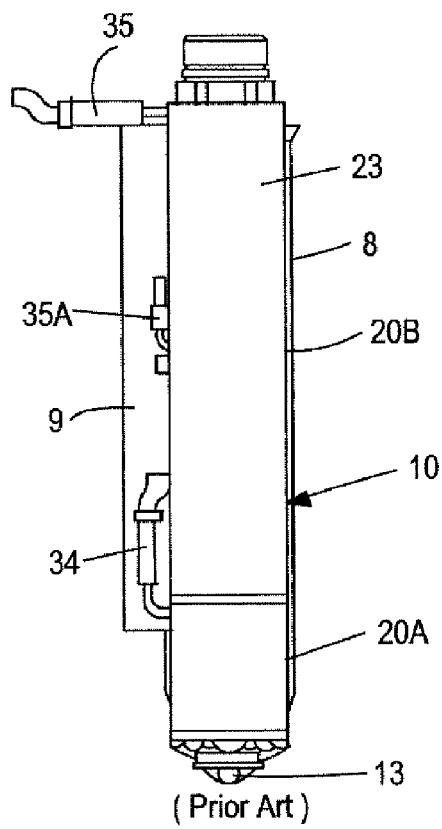
FIG. 2 depicts an injection nozzle with two separate heating cylinders according to the prior art.
Figure 3:
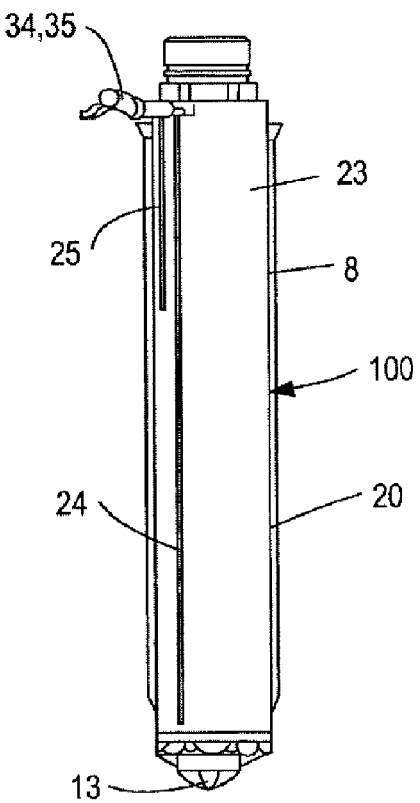
FIG. 3 depicts an injection nozzle with an exemplary embodiment of a heating cylinder according to the present invention.

FIG. 3 shows an injection nozzle 100 to which the hollow heating cylinder 20 according to the invention is attached. It can be seen that the complete injection nozzle 100 does not have any parts projecting radially along its entire length, as does the known injection nozzle 10 of FIG. 2. It can in addition be seen that the indicated accommodating bore 8 of the tool does not need the groove 9 (see FIG. 2) as required in the prior art. The electrical connections 34, 35 of the two heating coils are at the end of the nozzle turned away from the tool, and are outside the accommodating bore 8. The thin connecting lines for the temperature sensors in the mouth region and in the shank region lie, respectively, in a small longitudinal grooves 24 and 25 in the protective jacket 23, owing to which there is no expansion in the radial direction.

Heating, as in the prior art, may be controlled or regulated separately in the mouth region and in the shank region of the nozzle. The greater thickness of the windings of the heating cartridge 30 on the supporting cylinder 21 in the mouth region B1 is preferably but is not a requirement of the present invention. However, it is advantageous, since if similar pitches in both regions are utilized, the current-carrying capacity of the heating coil 32 would have to be higher than that of the heating coil 33, with the consequence that the heating coils in both regions would have to be dimensioned electrically unlike.

While various embodiments of the invention have been shown and described, numerous variations and alternate embodiments will occur to those skilled in the art. Accordingly, it is intended that the invention be limited only in terms of the appended claims.

What is claimed is:

1. A hollow one piece heating cylinder for attachment to an injection nozzle for an injection molding system, the heating cylinder having an elongated heating cartridge wound spirally around the outside thereof, said heating cartridge having a first and a second electrically heatable heat conductor, said heat conductors being electrically separated from one another and being located in substantially different regions in the longitudinal direction of said heating cylinder, said first heat conductor being positioned for heating the mouth region of an injection nozzle and said second heat conductor being positioned for heating the shank region of an injection nozzle.

2. The hollow heating cylinder according to claim 1, wherein said first and second heat conductors have electrical connections which are positioned at the end of the heating cartridge opposite to said first heat conductor.

3. The hollow heating cylinder according to claim 1 wherein said heat conductors comprise spiral heating coils.

4. The heating cylinder according to claim 1 wherein said heating cartridge is positioned in a spiral groove on the outside surface of said heating cylinder.

5. The heating cylinder according to claim 4, wherein said spiral groove in the region adjacent said first heat conductor has a smaller pitch than in the remaining region.

6. The heating cylinder according to claim 1 further comprising an outer protective jacket surrounding said heating cylinder.

7. The heating cylinder according to claim 6 further comprising longitudinal grooves in said protective jacket for positioning temperature sensors for the mouth and shank regions of the nozzles.

8. An injection molding system comprising at least one mold tool and at least one injection nozzle, the improvement comprising a hollow one piece heating cylinder positioned on said injection nozzle, said hollow heating cylinder having a body member and an elongated heating cartridge spirally would around said body member, said heating cartridge having a first heat conductor and a second heat conductor positioned therein, said first and second heat conductors located in different regions in the longitudinal direction of said body member.

9. The injection molding system according to claim 8 wherein said body member has a spiral groove on the outer surface and said elongated heating cartridge is positioned on said spiral groove.

10. The injection molding system according to claim 9 wherein said spiral groove has a first pitch for positioning of said first heat conductor and a second pitch different than said first pitch for positioning of said second heat conductor.

11. The injection molding system according to claim 9 wherein said first and second heat conductors each comprise spiral heating coils.

12. The injection molding system according to claim 8 further comprising a jacket member positioned over said hollow heating cylinder.

13. The injection molding system according to claim 12 further comprising temperature sensor members positioned in said jacket member.

\* \* \* \* \*